United States Patent

Hashimoto

Patent Number: 6,129,423
Date of Patent: Oct. 10, 2000

[54] BRAKE FORCE CONTROL APPARATUS

[75] Inventor: Yoshiyuki Hashimoto, Susono, Japan

[73] Assignee: Toyota Jidosha Kabushiki Kaisha, Aichi-ken, Japan

[21] Appl. No.: 09/171,588

[22] PCT Filed: Apr. 24, 1997

[86] PCT No.: PCT/JP97/01439

§ 371 Date: Jan. 19, 1999

§ 102(e) Date: Jan. 19, 1999

[87] PCT Pub. No.: WO97/39933

PCT Pub. Date: Oct. 30, 1997

[30] Foreign Application Priority Data

Apr. 25, 1996 [JP] Japan .................... 8-104876

[51] Int. Cl.[7] .............. B60T 7/12; B60T 13/66
[52] U.S. Cl. .............. 303/125; 701/70; 701/78; 188/356; 188/358; 303/155; 303/113.4; 303/114.3; 303/DIG. 4; 303/166; 303/159
[58] Field of Search .................... 303/125, 135, 303/166, 167, 155, DIG. 3, DIG. 4, 174, 177, 113.4, 114.3, 114.1, 3, 159, 15, 122.06, 20, 13–14, 122.11, 122.12, 122.13, 113.2, 113.3, 116.1–119.2; 701/70, 78; 188/DIG. 1, 356, 357, 358

[56] References Cited

U.S. PATENT DOCUMENTS

| | | |
|---|---|---|
| 4,774,667 | 9/1988 | Kuraoka et al. |
| 5,158,343 | 10/1992 | Reichelt et al. |
| 5,261,730 | 11/1993 | Steiner et al. |
| 5,350,225 | 9/1994 | Steiner et al. |
| 5,367,942 | 11/1994 | Nell et al. |
| 5,427,442 | 6/1995 | Heibel |
| 5,445,444 | 8/1995 | Rump et al. |
| 5,492,397 | 2/1996 | Steiner et al. |
| 5,496,099 | 3/1996 | Resch |
| 5,499,866 | 3/1996 | Brugger et al. |
| 5,513,906 | 5/1996 | Steiner |
| 5,535,123 | 7/1996 | Rump et al. |
| 5,539,641 | 7/1996 | Littlejohn |
| 5,549,369 | 8/1996 | Rump et al. |
| 5,556,173 | 9/1996 | Steiner et al. |
| 5,564,797 | 10/1996 | Steiner et al. |

(List continued on next page.)

FOREIGN PATENT DOCUMENTS

| | | |
|---|---|---|
| 0711695 | 5/1996 | European Pat. Off. |
| 61-268560 | 11/1986 | Japan |
| 3-227766 | 10/1991 | Japan |
| 4-121604 | 4/1992 | Japan |
| 5-97022 | 4/1993 | Japan |
| 7-76267 | 3/1995 | Japan |
| 7-315184 | 12/1995 | Japan |
| 7-329766 | 12/1995 | Japan |
| 8-34326 | 2/1996 | Japan |
| 8-40229 | 2/1996 | Japan |
| 8-295224 | 4/1996 | Japan |
| 2282649 | 4/1995 | United Kingdom |
| 2295209 | 5/1996 | United Kingdom |
| WO96/6753 | 3/1996 | WIPO |

Primary Examiner—Douglas C. Butler
Attorney, Agent, or Firm—Kenyon & Kenyon

[57] ABSTRACT

In a brake force control apparatus selectively performing a brake assist (BA) control for generating a brake force greater than that of a normal control time, an unnecessary restart of the BA control immediately after the BA control is terminated is prevented. The BA control is terminated when it is determined that an emergency braking is unnecessary since a master cylinder pressure ($P_{M/C}$) has been reduced to a value less than a predetermined value. A restart of the BA control which is caused by a sharp change in the master cylinder pressure ($P_{M/C}$) and a rate of change ($\Delta P_{M/C}$) thereof due to a rapid decrease in a fluid pressure when the BA control is terminated is prohibited until a predetermined time has been passed after the BA control was terminated.

11 Claims, 5 Drawing Sheets

U.S. PATENT DOCUMENTS

| | | |
|---|---|---|
| 5,567,021 | 10/1996 | Gaillard . |
| 5,584,542 | 12/1996 | Klarer et al. . |
| 5,586,814 | 12/1996 | Steiner . |
| 5,607,209 | 3/1997 | Narita et al. .............. 303/122.11 |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,762,407 | 6/1998 | Stacey et al. ................ 303/113.4 |
| 5,772,290 | 6/1998 | Heibel et al. . |
| 5,779,329 | 7/1998 | Takeshima ..................... 303/155 |
| 5,890,776 | 4/1999 | Sawada ........................ 303/155 |
| 5,931,545 | 8/1999 | Yonemura et al. .............. 303/125 |
| 5,961,188 | 10/1999 | Sawada ..................... 303/116.1 |
| 5,978,725 | 11/1999 | Kagawa ....................... 303/125 |

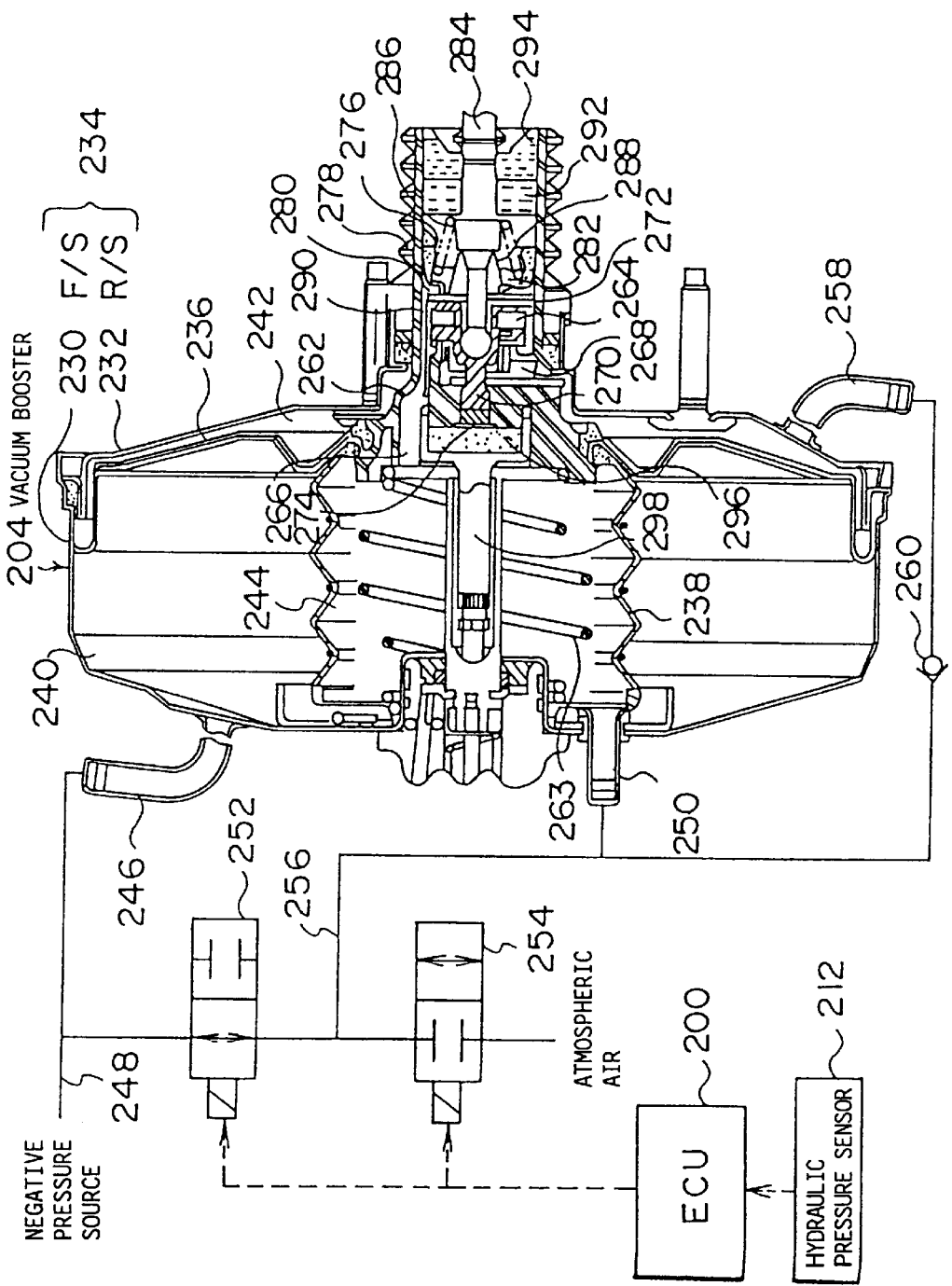

BRAKE FORCE CONTROL APPARATUS

TECHNICAL FIELD

The present invention relates to a brake force control apparatus and, more particularly, to a brake force control apparatus which generates, when an emergency braking is required, a brake force greater than that generated in an ordinary time.

BACKGROUND ART

Conventionally, for example, as disclosed in Japanese Laid-Open Patent Application 4-121260, a brake force control apparatus which generates, when an emergency braking is required, a brake force greater than that generated in a normal time is known. The above-mentioned conventional apparatus comprises a control circuit which generates a drive signal corresponding to an operational speed of a brake pedal and a fluid pressure generating mechanism which generates a brake fluid pressure corresponding to the drive signal generated by the control circuit.

The control circuit determines that, when an operational speed of a brake pedal is less then a predetermined value, the brake pedal is not normally operated. In this case, the fluid pressure generating mechanism is controlled so that a brake fluid pressure corresponding to a brake pressing force is generated. Hereinafter, this control is referred to as a normal control. Additionally, the control circuit determines that, when an operational force of the brake pedal exceeds a predetermined value, an emergency braking is required by the driver. In this case, the fluid pressure generating mechanism is controlled so that a brake fluid pressure is maximized. Hereinafter, this control is referred to as a brake assist control. Thus, according to the above-mentioned conventional apparatus, a brake force corresponding to a brake pressing force can be generated in a normal time, and a large brake force can be immediately generated in an emergency.

In the above-mentioned conventional apparatus, a normal braking operation and an emergency requiring an emergency braking are discriminated in accordance with an operational speed of the brake pedal. Generally, the operational speed of the brake pedal when an emergency braking is required is higher than that of the normal braking operation. Thus, according to the above-mentioned discriminating method, the operation requiring an emergency braking and the operation requiring a normal brake can be discriminated with high accuracy.

When an amount of depression of the brake pedal is detected, it is determined that the emergency braking is not required any more and the control is switched from the brake assist control to the normal brake control. In this case, a fluid pressure generated by the fluid pressure generating mechanism is reduced discontinuously due to switching shocks. Thus, a vibration is generated in the fluid pressure of the brake force control apparatus, and such vibration is transmitted to the master cylinder or the brake pedal. If the vibration is transmitted to the brake pedal, an operational speed of the brake pedal may be increased and exceeds the above-mentioned predetermined value even though an amount of depression of the brake pedal is decreased. In this case, the brake assist control is unnecessarily started. Additionally, a noise may be superimposed on an output signal of the sensor which detects an operational speed of the brake pedal. As mentioned above, in the above-mentioned conventional apparatus, it is possible that an execution of the brake assist control is started immediately after the brake assist control is terminated even though an emergency braking is not required.

DISCLOSURE OF INVENTION

It is an object of the present invention to provide an improved and useful brake force control apparatus in which the above-mentioned problems are eliminated.

A more specific object of the present invention is to provide a brake force control apparatus in which the brake assist control is not improperly performed immediately after the brake assist control is terminated.

In order to achieve the above-mentioned objects, there is provided according to the present invention a brake force control apparatus of a vehicle selectively performing a normal control for generating a brake force corresponding to a brake pressing force and a brake assist control for generating a brake force larger than that of the normal control, characterized by:

control start determining means for determining whether or not the brake assist control should be performed based on a change in a driving condition of the vehicle due to an operation of a brake pedal; and control prohibiting means for prohibiting an execution of a subsequent brake assist control operation after a previous brake assist control operation was terminated and until a predetermined time has been passed.

In the present invention, the brake force control apparatus generates a brake force greater than that of a normal control time when the brake assist control is being performed. Accordingly, when the brake assist control is terminated, a sharp change is generated in a brake force generated by the brake force control apparatus. In association with such a change, a vibration is generated in a fluid pressure of the brake force control apparatus. Such a vibration influences an operational state of the brake pedal. Due to this change it is possible that a start condition of the brake assist control is satisfied. In the present invention, an execution of the brake assist control is prohibited by the brake assist control prohibiting means until an elapsed time after the brake assist control was terminated reaches a predetermined time. Accordingly, the brake assist control is not performed if the condition to start the brake assist control is satisfied immediately after the brake assist control is terminated.

As mentioned above, according to the present invention, a start of the brake assist control which should not be performed immediately after a brake assist control operation was terminated can be prevented by prohibiting a start of the brake assist control after the brake assist control was terminated and until the predetermined time has been passed.

The control start determining means may determine whether or not the brake assist control should be performed based on a pressure of a master cylinder.

In one embodiment according to the present invention, the control start determining means prohibits the brake assist control when the pressure of the master cylinder is greater than a predetermined value.

Additionally, the control start determining means may prohibit the brake assist control when a rate of change of the pressure of the master cylinder is greater than a predetermined value.

Additionally, the predetermined time may preferably range from 100 milliseconds to 200 milliseconds, and is more preferably 120 milliseconds.

Additionally, the control start determining means determines whether or not the brake assist control should be performed based on one of a brake pressing force, a pedal stroke of the brake pedal, a deceleration of the vehicle, a speed of the vehicle and a wheel speed of the vehicle Other objects, features and advantages of the present invention will become more apparent from the following detailed descriptions when read in conjunction with the accompanying drawings.

BRIEF DESCRIPTION OF DRAWINGS

FIG. 6 is a cross-sectional view of a vacuum booster used in the brake force control apparatus shown in FIG. 5.

BEST MODE FOR CARRYING OUT THE INVENTION

Figure 1:
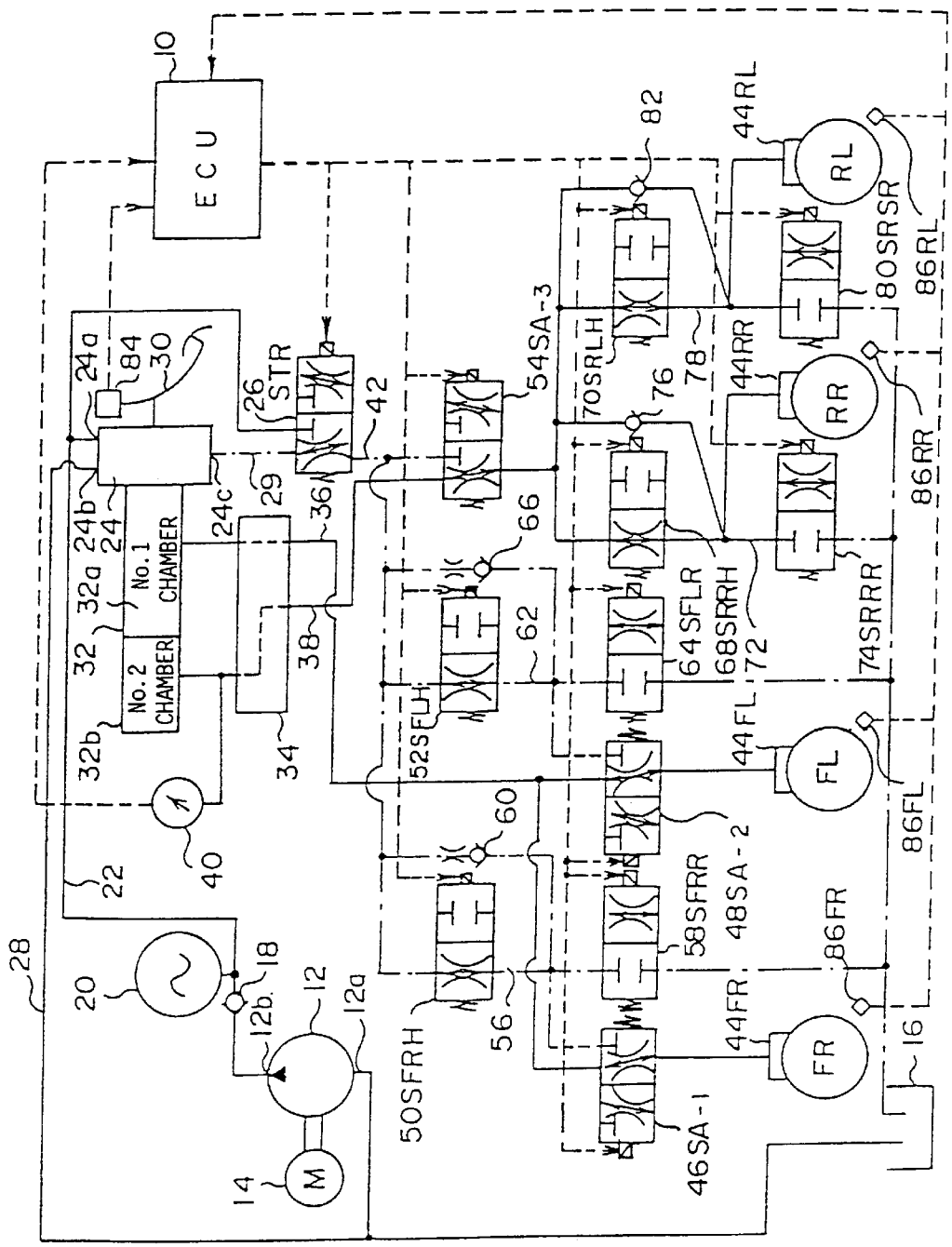
FIG. 1 is a system structure diagram of a brake force control apparatus according to an embodiment of the present invention.

FIG. 1 is a system structure diagram of a brake force control apparatus according to an embodiment of the present invention. The brake force control apparatus shown in FIG. 1 is controlled by an electronic control unit 10 (hereinafter, referred to as ECU 10). The brake force control apparatus comprises a pump 12. The pump 12 has a motor 14 as a power source thereof. An inlet port 12a of the pump 12 communicates with a reservoir tank 16. An accumulator 20 communicates with an outlet port 12b of the pump via a check valve 18. The pump 12 delivers brake fluid in the reservoir tank 16 from the outlet port 12b so that a predetermined pressure is always accumulated in the accumulator 20.

The accumulator 20 communicates with a high-pressure port 24a of a regulator 24 via a high-pressure passage 22, and communicates with a regulator switching solenoid 26 (hereinafter, referred to as STR 26). The regulator 24 has a low-pressure port 24b and a control fluid pressure port 24c. The low-pressure port 24b communicates with the reservoir tank 16 via a low-pressure passage 28. The control fluid pressure port 24c communicates with the STR 26 via a control fluid pressure passage 29. The STR 26 is a two-position solenoid valve which selectively set one of the control fluid pressure passage 29 and the high-pressure passage 22 in a conductive state, and sets the control fluid pressure passage 29 in a conductive state and sets the high-pressure passage in a closed state in a normal state. Hereinafter, the two-position solenoid valve means a solenoid valve of which state can be switched either one of two states.

A brake pedal 30 is connected to the regulator 24, and a master cylinder is mounted to the regulator 24. The regulator 24 has a fluid pressure chamber therein. The fluid pressure chamber always communicates with the control fluid pressure port 24c, and selectively communicates with the high-pressure port 24a or the low-pressure port 24b in accordance with an operational state of the brake pedal 30. The regulator 24 is configured so that a pressure inside the fluid pressure chamber is adjusted to a fluid pressure corresponding to a brake pressing force $F_P$ exerted on the brake pedal 30. Accordingly, the fluid pressure corresponding to the brake pressing force $F_P$ always appears at the control fluid pressure port 24c of the regulator 24. Hereinafter, this fluid pressure is referred to as a regulator pressure $P_{RE}$.

The brake pressing force $F_P$ exerted on the brake pedal 30 is mechanically transmitted to a master cylinder 32 via the regulator 24. Additionally, a force corresponding to the fluid pressure inside the fluid pressure chamber of the regulator 24, that is, a force corresponding to the regulator pressure $P_{RE}$, is transmitted to the master cylinder 32.

The master cylinder 32 is provided with a first fluid pressure chamber 32a and a second fluid pressure chamber 32b therein. A master cylinder pressure $P_{M/C}$ corresponding to a resultant force of the brake pressing force $F_P$ and a brake assist force $F_A$ is generated in the first fluid pressure chamber 32a and the second fluid pressure chamber 32b. Both the master cylinder pressure $P_{M/C}$ generated in the first fluid pressure chamber 32a and the master cylinder pressure $P_{M/C}$ generated in the second fluid pressure chamber 32b are supplied to a proportioning valve 34 (hereinafter, referred to as P valve 34).

The P valve 34 communicates with a first fluid pressure passage 36 and a second fluid pressure passage 38. The P valve 34 supplies the master cylinder pressure $P_{M/C}$ to the first fluid pressure passage 36 and the second fluid pressure passage 38 without change in a range where the master cylinder pressure $P_{M/C}$ is less than a predetermined value. Additionally, the P valve 34 supplies the master cylinder pressure $P_{M/C}$ to the first fluid pressure passage 36 without change and supplies a fluid pressure obtained by decreasing the master cylinder pressure $P_{M/C}$ by a predetermined ratio to the second fluid pressure passage 38 in a range where the master cylinder pressure $P_{M/C}$ is less than a predetermined value.

A hydraulic pressure sensor 40, which outputs an electric signal corresponding to the master cylinder pressure $P_{M/C}$, is provided between the second fluid pressure chamber 32b and the P valve 34. An output signal of the hydraulic pressure sensor 40 is supplied to the ECU 10. The ECU 10 detects the master cylinder pressure $P_{M/C}$ generated in the master cylinder 32 based on the output signal of the hydraulic pressure sensor 40.

The above-mentioned STR 26 communicates with a third fluid pressure passage 42. The third fluid pressure passage 42 communicates with one of the control fluid pressure passage 29 and the high-pressure passage 22 in accordance with a state of the STR 26. In the present embodiment, wheel cylinders 44FL and 44FR provided to left and right front wheels FL and FR are provided with a brake fluid pressure from the first fluid pressure passage 36 communicating with the P valve 34 or the third fluid pressure passage 42 communicating with the STR 26. Additionally, wheel cylinders 44RL and 44RR provided to left and right rear wheels RL and RR are provided with a brake fluid pressure from the second fluid pressure passage 38 communicating with the P valve 34 or the third fluid pressure passage 42 communicating with the STR 26.

The first fluid pressure passage 36 communicates with a first assist solenoid valve 46 (hereinafter referred to as SA-1 46) and a second assist solenoid valve 48 (hereinafter, referred to as SA-2 48). On the other hand, the third fluid pressure passage 42 communicates with a right front holding solenoid valve 50 (hereinafter, referred to as SFRH 50), a left front holding solenoid valve 52 (hereinafter, referred to as SFLH 52) and a third assist solenoid valve 54 (hereinafter, referred to as SA-3 54).

The SFRH 50 is a two-position solenoid valve which maintains an open state in a normal state. The SFRH 50 communicates with the SA-1 46 and a right front wheel pressure decreasing solenoid valve 58 (hereinafter, referred to as SFRR 58) via a pressure adjusting fluid pressure passage 56. A check valve 60 permitting a fluid flow only in a direction from the pressure adjusting fluid pressure passage 56 to the third fluid pressure passage 42 is provided, in parallel, between the third fluid pressure passage 42 and the pressure adjusting fluid pressure passage 56.

The SA-1 46 is a two-position solenoid valve which selectively renders one of the first fluid pressure passage 36 and the pressure adjusting fluid pressure passage 56 to communicate with the wheel cylinder 44FR, and renders the first fluid pressure passage 36 and the wheel cylinder 44FR to be in a communicating state in a normal state (OFF state). On the other hand, the SFRR 58 is a two-position solenoid valve which renders the pressure adjusting fluid pressure passage 56 and the reservoir tank 16 to be in a connected state or a disconnected state. The SFRR 58 renders the pressure adjusting fluid pressure passage 56 and the reservoir tank 16 to be in a disconnected state in a normal state (OFF state).

The SFLH 52 is a two-position solenoid valve which maintains an open state in a normal state. The SFLH 52 communicates with the SA-2 48 and a left front wheel pressure decreasing solenoid valve 64 (hereinafter, referred to as SFLR 64) via a pressure adjusting fluid pressure passage 62. A check valve 66 permitting a fluid flow only in a direction from the pressure adjusting fluid pressure passage 62 to the third fluid pressure passage 42 is provided, in parallel, between the third fluid pressure passage 42 and the pressure adjusting fluid pressure passage 62.

The SA-2 48 is a two-position solenoid valve which selectively renders one of the first fluid pressure passage 36 and the pressure adjusting fluid pressure passage 62 to communicate with the wheel cylinder 44FL, and renders the first fluid pressure passage 36 and the wheel cylinder 44FL to be in a communicating state in a normal state (OFF state). On the other hand, the SFLR 64 is a two-position solenoid valve which renders the pressure adjusting fluid pressure passage 62 and the reservoir tank 16 to be in a connected state or a disconnected state. The SFLR 64 renders the pressure adjusting fluid pressure passage 62 and the reservoir tank 16 to be in a disconnected state from each other in a normal state (OFF state).

The second fluid pressure passage 38 communicates with the above-mentioned SA-3 54. The downstream side of the SA-3 54 communicates with a right rear wheel holding solenoid valve 68 (hereinafter, referred to as SRRH 68) provided in correspondence with a wheel cylinder 44RR of the right rear wheel RR and a left rear wheel holding solenoid valve 70 (hereinafter, referred to as SRLR 70) provided in correspondence with a wheel cylinder 44RL of the left rear wheel RL. The SA-3 54 is a two-position solenoid valve which selectively selectively renders one of the second fluid pressure passage 38 and the third fluid pressure passage 42 to communicate with the SRRH 68 and the SRLR 70, and renders the second fluid pressure passage 38, the SRRH 68 and the SRLR 70 in a communicating state in a normal state (OFF state).

The downstream side of the SRRH 68 communicates with the wheel cylinder 44RR and a right rear wheel pressure decreasing solenoid valve 74 (hereinafter, referred to as SRRR 74) via a pressure adjusting fluid pressure passage 72. The SRRR 74 is a two-position solenoid valve which renders the pressure adjusting fluid pressure passage 72 and the reservoir tank 16 in a communicating state or a disconnected state, and renders the pressure adjusting fluid pressure passage 72 and the reservoir tank 16 in the disconnected state in a normal state (OFF state). Additionally, a check valve 76 permitting a fluid flow only in a direction from the pressure adjusting fluid pressure passage 72 to the SA-3 54 is provided, in parallel, between the SA-3 54 and the pressure adjusting fluid pressure passage 72.

Similarly, the downstream side of the SRLH 70 communicates with the wheel cylinder 44RL and a left rear wheel pressure decreasing solenoid valve 80 (hereinafter, referred to as SRLR 80) via a pressure adjusting fluid pressure passage 78. The SRLR 80 is a two-position solenoid valve which renders the pressure adjusting fluid pressure passage 78 and the reservoir tank 16 in a communicating state or a disconnected state, and renders the pressure adjusting fluid pressure passage 78 and the reservoir tank 16 in the disconnected state in a normal state (OFF state). Additionally, a check valve 82 permitting a fluid flow only in a direction from the pressure adjusting fluid pressure passage 78 to the SA-3 54 is provided, in parallel, between the SA-3 54 and the pressure adjusting fluid pressure passage 78.

In the system according to the present embodiment, a brake switch 84 is provided near the brake pedal 30. The brake switch 84 is a switch that generates an ON output when the brake pedal 30 is pressed. The output signal of the brake switch 84 is supplied to the ECU 10. The ECU 10 determines whether or not a braking operation is performed by the driver based on the output signal of the brake switch 84.

Additionally, in the system according to the present embodiment, wheel speed sensors 86FL, 86FR, 86RL and 86RR (hereinafter, these are referred to as 86\*\* as a whole) are provided near the left and right front wheels FL and FR and the left and right rear wheels RL and RR, each of the sensors generating a pulse signal when the respective wheel rotates a predetermined angle. The output signals of the wheel speed sensors 86\*\* are supplied to the ECU 10. The ECU 10 detects a wheel speed of each of the wheels FL, FR, RL and RR based on the output signals of the wheel speed sensors 86\*\*.

The ECU 10 supplies, if necessary, drive signals to the above-mentioned STR 26, SA-1 46, SA-2 4E3, SA-3 54, SFRH 50, SFLH 52, SFRR 58, SFLR 64, SRRH 68, SRLH 70, SRRR 74 and SRLR 80 based on the output signal of the brake switch 84.

A description will now be given of an operation of the brake force control apparatus according to the present embodiment. The brake force control apparatus according to the present embodiment performs the normal control for generating a brake force corresponding to the brake pressing force FP exerted on the brake pedal 30 when the vehicle is in a stable state. The normal control can be achieved, as shown in FIG. 1, by turning off all of the STR 26, SA-1 46, SA-2 48, SA-3 54, SFRH 50, SFLH 52, SFRR 58, SFLR 64, SRRH 68, SRLH 70, SRRR 74 and SRLR 80 based on the output signal of the brake switch 84.

That is, in the state shown in FIG. 1, the wheel cylinders 44FR and 44FL communicate with the first fluid pressure passage 36, and the wheel cylinders 44RR and 44RL communicate with the second fluid pressure passage 38. In this case, the brake fluid flows between the master cylinder 32 and the wheel cylinders 44FR, 44FL, 44RL and 44RR (hereinafter, these may be referred to as 44\*\* as a whole), and a brake force corresponding to the brake pressing force FP is generated in each of the wheels FL, FR, RL and RR.

In the present embodiment, when a possibility for shifting to a locked state is detected in one of the wheels, it is determined that a condition for performing an antilock brake control (hereinafter, referred to as ABS control) is established and the ABS control is started thereafter. The ECU 10 calculates wheel speeds V$_{WFL}$, V$_{WFR}$, V$_{WRL}$ and V$_{WRR}$ (hereinafter, these are referred to as V$_W$ as a whole) of the wheels based on output signals of the wheel speed sensors 86**\*\*. Additionally, the ECU 10 calculates an assumed value V$_{SO}$ (hereinafter, referred to as an assumed vehicle speed V$_{SO}$) of a speed of the vehicle according to a publicly known method. Then, when the vehicle is in a braking state, the ECU 10 calculates a slip rate S of each wheel according to the following equation so as to determine that the wheel may shift to a locked state when the slip rate S exceeds a predetermined value.

$$S=(V_{SO}-V_W**)\cdot 100/V_{SO} \qquad (1)$$

When the condition for performing the ABS control is established, the ECU 10 outputs the drive signals to the SA-1 46, SA-2 48 and SA-3 54. As a result, when the SA-1 46 is turned on, the wheel cylinder 44FR is disconnected from the first fluid pressure passage 36 and connected to the pressure adjusting fluid pressure passage 56. Additionally, when the SA-2 48 is turned on, the wheel cylinder 44FL is disconnected from the first fluid pressure passage 36 and connected to the pressure adjusting fluid pressure passage 62. Further, when the SA-3 54 is turned on, the upstream side of the SRRH 68 and the SRLH 70 is disconnected from the second fluid pressure passage 38 and connected to the third fluid pressure passage 42.

In this case, all wheel cylinders 44\*\* communicate with respective holding solenoid valves SFRH 50, SFLH 52, SRRH 68 and SRLH 70 (hereinafter, these are referred to as holding solenoid S\*\*H) and respective pressure decreasing solenoid valves SFRR 58, SFLR 64, SRRR 74 and SRLR 80 (hereinafter, these are referred to as pressure decreasing solenoid S\*\*R), and a regulator pressure P$_{RE}$ is introduced to the upstream side of each of the holding solenoids S\*\*H via the third fluid pressure passage 42 and the STR 26.

In the above-mentioned condition, a wheel cylinder pressure P$_{W/C}$ of the respective wheel cylinders 44\*\* is increased with the regulator pressure P$_{RE}$ as an upper limit by the holding solenoids S\*\*H being in an open state and the pressure decreasing solenoids S\*\*R being in a closed state. Hereinafter, this state is referred to as a pressure increasing mode ①. Additionally, the wheel cylinder pressure P$_{W/C}$ of the respective wheel cylinders 44\*\* is maintained without being increased or decreased by the holding solenoids S\*\*H being in a closed state and the pressure decreasing solenoids S\*\*R being in the closed state. Hereinafter, this state is referred to as a holding mode ②. Further, the wheel cylinder pressure P$_{W/C}$ of the respective wheel cylinders 44\*\* is decreased by the holding solenoids S\*\*H being in the closed state and the pressure-decreasing solenoids S\*\*R being in the open state. Hereinafter, this state is referred to as a pressure decreasing mode ③. The ECU 10 sets, if necessary, the above-mentioned pressure increasing mode ①, holding mode ② and pressure decreasing mode ③ so that a slip rate S of each wheel during a braking time becomes an appropriate value, that is, so that each wheel does not shift to the locked state.

When a depression of the brake pedal 30 is released by the driver during execution of the ABS control, the wheel cylinder pressure P$_{W/C}$ must be immediately decreased. In the system according to the present embodiment, the check valves 60, 66, 76 and 82 are provided in a hydraulic pressure paths corresponding to each of the wheel cylinders 44\*\*, each of the check valves 60, 66, 76 and 82 permitting a fluid flow only in the directions from the wheel cylinders 44\*\* to the third fluid pressure passage 42. Thus, according to the system of the present embodiment, the wheel cylinder pressures P$_{W/C}$ of all of the wheel cylinders 44\*\* can be immediately decreased after the depression of the brake pedal 30 is released.

In the system according to the present embodiment, when the ABS control is performed, the wheel cylinder pressure P$_{W/C}$ is increased by the brake fluid being supplied from the regulator 24 to the wheel cylinders 44\*\*, that is, by the brake fluid being supplied from the pump 12 to the wheel cylinders 44\*\*, and is decreased by the brake fluid in the wheel cylinders 44\*\* flowing to the reservoir tank 16. When the increase in the wheel cylinder pressure P$_{W/C}$ is performed by using the master cylinder 32 as a fluid pressure source and if the pressure increasing mode and the pressure decreasing mode are repeatedly performed, the brake fluid in the master cylinder 32 gradually decreases and a so-called bottoming of the master cylinder may occur.

On the other hand, if the pump 12 is used as a fluid pressure source so as to increase the wheel cylinder pressure P$_{W/C}$, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABC; control, as a precondition, a braking operation having a level at which a large slip rate S is generated in one of the wheels must be performed.

Figure 2:
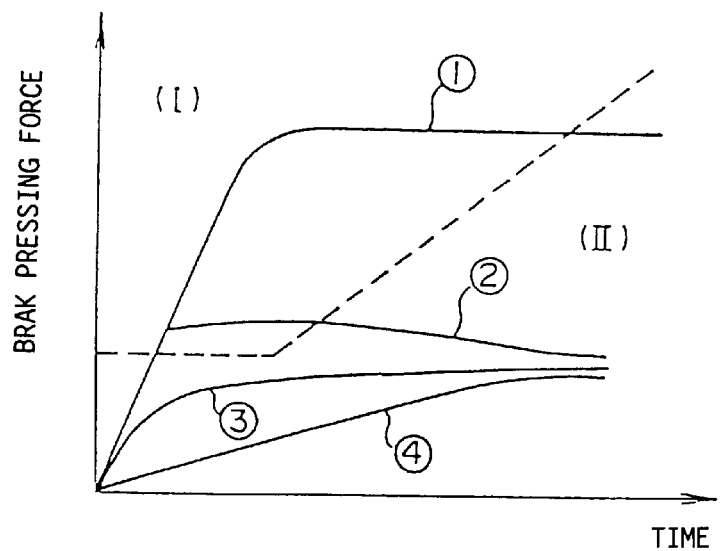
FIG. 2 is an illustration for showing a change in a brake pressing force achieved under various circumstances.

FIG. 2 shows changes in the brake pressing force F$_P$ applied to the brake pedal 30 with respect to time under various conditions. Curves indicated by ① and ② in FIG. 2 represent changes in the pressing force F$_P$ when an emergency braking is performed by a highly skilled driver (hereinafter, referred to as a high-grade driver) and an unskilled driver or a driver lacking strength (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force F$_P$ is immediately and rapidly increased in response to establishment of a condition in which an emergency braking is required, and a large brake pressing force F$_P$ can be maintained for a long time. If such a brake pressing force F$_P$ is exerted on the brake pedal 30, a sufficiently high brake fluid pressure can be provided from the master cylinder 32 to each of the wheel cylinders 44\*\* so as to start the ABS control.

However, as shown by the curve ② when the driver of the vehicle is a beginner-grade driver, the brake pressing force F$_P$ may not be increased to a sufficiently high value in response to establishment of the condition in which an emergency braking is required. If the brake pressing force F$_P$ exerted on the brake pedal 30 is not sufficiently increased as shown by the curve ② after an emergency braking is required, the wheel cylinder pressure P$_{W/C}$ in each of the wheels 44\*\* is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure $P_{W/C}$ even if the brake pressing force $F_P$ is not sufficiently increased when the brake pedal is operated with an intention to perform an emergency braking Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force $F_P$ when the driver operates the brake pedal with an intention to perform a normal braking operation under various conditions. As shown by the curves ① to ④, a change in the brake pressing force $F_P$ associated with the normal braking operation is gentle as compared to a change in the brake pressing force $F_P$ associated with an emergency braking operation. Additionally, a convergent value of the brake pressing force $F_P$ associated with the normal braking operation is not so large as a convergent value of the brake pressing force $F_P$ associated with an emergency braking operation.

Giving attention to those differences, when the brake pressing force $F_P$ is increased to a sufficiently large value at a rate of change exceeding a predetermined value after a braking operation is started, that is, when the brake pedal 30 is operated so that the brake pressing force $F_P$ reaches an area indicated by (I) in FIG. 2, it can be determined that an emergency braking is performed.

Additionally, when the rate of change of the brake pressing force $F_P$ is smaller than the predetermined value or when the convergent value of the brake pressing force $F_P$ is smaller than the predetermined value, that is, when the brake pedal 30 is operated so that the brake pressing force $F_P$ always changes within an area indicated by (II) in FIG. 2, it can be determined that a normal braking operation is performed.

Accordingly, in the system according to the present embodiment, an operational speed and an amount of operation of the brake pedal is detected or assumed, and, then, it is determined whether or not the operational speed exceeds the predetermined value and whether or not the amount of operation exceeds the predetermined value, and, thereby, it can be determined whether or not the operation to the brake pedal 30 is intended to perform an emergency braking.

In a vehicle provided with the brake force control apparatus according to the present embodiment, the brake pedal 30 is moved by an increase or decrease in the brake pressing force $F_P$. At this time, a larger operational speed is generated in the brake pedal 30 as the brake pressing force shows a steep slope, and an amount of operation substantially corresponding to the brake pressing force $F_P$ is generated. Accordingly, the operational speed and the amount of operation of the brake pedal 30 can be accurately assumed from the brake pressing force $F_P$.

When the brake pressing force $F_P$ is exerted on the brake pedal 30, a stroke L corresponding to the brake pressing force $F_P$ is generated in the brake pedal 30. Additionally, when the stroke L is generated in the brake pedal 30, a master cylinder pressure $P_{M/C}$ corresponding to the stroke L, which corresponds to the brake pressing force $F_P$, is generated in the master cylinder 32. When the master cylinder pressure $P_{M/C}$ corresponding to the brake pressing force $F_P$ is generated, a vehicle deceleration G corresponding to the brake pressing force $F_P$ is generated in the vehicle. Accordingly, en operational speed and an amount of operation of the brake pedal 30 can be assumed from parameters including ② the pedal stroke L, ③ the master cylinder pressure $P_{M/C}$, ④ the vehicle deceleration G, ⑤ the assumed vehicle speed $V_{SO}$ and ⑥ the wheel speed $V_W{**}$, other than the above-mentioned ① brake pressing force $F_P$.

In order to accurately assume an operational speed and an amount of operation of the brake pedal 30, that is, in order to accurately discriminate an emergency braking and a normal brake, preferred parameters of the above-mentioned parameters (hereinafter, referred to as basic parameters) are those detected at positions closest to the foot of the driver. According to such a pint of view, the parameters ① to ⑥ have a superiority in the order of ①→⑥ when used as the basic parameters.

In order to detect ① the brake pressing force $F_P$, it is required to provide (i) a pressing force sensor. Additionally, in order to detect ② the pedal stroke L, it is required to provide (ii) a stroke sensor. Similarly, in order to detect ③ the master cylinder pressure $P_{M/C}$ and ④ the vehicle deceleration G, it is required to provide a (iii) a hydraulic pressure sensor and (iv) a deceleration sensor, respectively. Further, in order to detect ⑤ the assumed vehicle speed $V_{SO}$ and ⑥ the wheel speed $V_W{**}$, it is required to provide (v) a wheel speed sensor.

The (v) wheel speed sensor and the (iv) deceleration sensor among the above-mentioned sensors (i) to (v) are conventionally and widely used sensors for a vehicle. On the other hand, the (ii) stroke sensor and the (i) pressing force sensor are not popular sensors for a vehicle. Accordingly, considering a cost merit of a sensor due to a mass production effect, the above-mentioned sensors (i) to (v) have a superiority in the order of (v)→(i).

In the system according to the present embodiment, considering the above-mentioned merit and demerit, the hydraulic pressure sensor 40 is used as a sensor for detecting the basic parameters so as to discriminate an emergency braking operation and a normal braking operation by using the master cylinder pressure $P_{M/C}$ as a basic parameter. A description will now be given of an operation of the system according to the present embodiment when it is determined by the ECU 10 that an emergency braking is performed.

The ECU 10 determines that an emergency braking is performed when the master cylinder pressure $P_{M/C}$ exceeding the predetermined value is detected and a rate of change $\Delta P_{M/C}$ is detected after the brake pedal 30 is pressed. When it is determined that an emergency braking is performed, the ECU 10 outputs the drive signals to the STR 26, the SA-1 46, the SA-2 48 and the SA-3 54.

When the STR 26 is turned on upon receipt of the above-mentioned drive signal, the third fluid pressure passage 42 and the high-pressure passage 22 are directly connected to each other. In this case, an accumulator pressure $P_{ACC}$ is introduced into the third fluid pressure passage 42. Additionally, when the SA-1 46 and the SA-2 48 are turned on upon receipt of the drive signals, the wheel cylinders 44FR and 44FL communicate with the pressure adjusting fluid pressure passages 56 and 62, respectively. Further, when the SA-3 54 is turned on upon receipt of the above-mentioned drive signal, the upstream side of the SRRH 68 communicates with the third fluid pressure passage 42. In this case, a state is established in which all of the wheel cylinders 44 communicate with the respective holding solenoids SH and the respective pressure decreasing solenoids S**R and the accumulator pressure $P_{ACC}$ is introduced to the upstream side of each of the holding solenoids S\*\*H.

In the ECU 10, all of the holding solenoids S\*\*H and all of the pressure decreasing solenoids S\*\*R are maintained in the OFF state immediately after execution of an emergency braking is detected. Accordingly, as mentioned above, when the accumulator pressure $P_{ACC}$ is introduced to the upstream side of the holding solenoids S\*\*H, the fluid pressure is provided to the wheel cylinders 44\*\* without being changed. As a result, the wheel cylinder pressure $P_{W/C}$ of all of the wheel cylinders 44\*\* is increased toward the accumulator pressure $P_{ACC}$.

As mentioned above, according to the system of the present embodiment, when an emergency braking is performed, the wheel cylinder pressure $P_{W/C}$ of all of the wheel cylinders 44\*\* can be immediately increased irrespective of a magnitude of the brake pressing force $F_P$. Thus, according to the system of the present embodiment, a large brake force can be generated immediately after establishment of a condition in which an emergency braking is required, even if the driver is a beginner-grade driver.

When the accumulator pressure $P_{ACC}$ begins to be supplied to the wheel cylinders 44\*\*, as mentioned above, a slip rate S of each of the wheels FL, FR, RL and RR is rapidly increased, and the condition for performing the ABS control is finally established. When the condition for performing the ABS control is established, the ECU 10 set, if necessary, the above-mentioned pressure-increasing mode ①, holding mode ② and pressure-decreasing mode ③ so that the slip rate S of each of the wheel becomes an appropriate value, that is, so that each of the wheels does not shift to the locked state.

It should be noted that when the ABS control is performed subsequent to an emergency braking operation, the wheel cylinder pressure $P_{W/C}$ is increased by using the pump 12 and the accumulator 20 as a fluid pressure source, and is decreased by the brake fluid in the wheel cylinders 44\*\* flowing to the reservoir tank 16. Accordingly, if the pressure increasing mode and the pressure decreasing mode are repeated, a so-called bottoming of the master cylinder 32 does not occur.

When the brake assist control is started as mentioned above by execution of an emergency braking operation, the brake assist control must be ended when a press of the brake pedal 30 is released. In the system according to the present invention, as mentioned above, the STR 26, the SA-1 46, the SA-2 48 and the SA-3 54 are maintained to be in the ON state. When the STR 26, the SA-1 46, the SA-2 48 and the SA-3 54 are in the ON state, each of the fluid pressure chamber in the regulator 24 and the first fluid pressure chamber 32a and the second fluid pressure chamber 32b becomes substantially a closed space.

Under the above-mentioned condition, the master cylinder pressure $P_{M/C}$ becomes a value corresponding to the brake pressing force $F_P$. Accordingly, by monitoring the output signal of the master cylinder pressure $P_{M/C}$ detected by the hydraulic pressure sensor 40, it can be easily determined whether or not a depression of the brake pedal 30 is has been released. When the release of the press of the brake pedal 30 is detected, the ECU 10 stops the supply of the drive signals to the STR 26, the SA-1 46, the SA-2 48 and the SA-3 54 so as to perform the normal control.

As for the basic parameters which are the basis of discrimination between an emergency braking and a normal brake, ① the brake pressing force $F_P$, ② the pedal stroke L, ④ the vehicle deceleration G, ⑤ the assumed vehicle speed $V_{SO}$ and ⑥ the wheel speed $V_W$\*\* other than the above-mentioned ③ master cylinder pressure $P_{M/C}$ may be applicable. Among those parameters, the ① brake pressing force $F_P$ and ② the pedal stroke L are parameters that are sensitive to a change in the brake pressing force $F_P$, similar to ③ the master cylinder pressure $P_{M/C}$. Accordingly, when ① the brake pressing force $F_P$ or ② the pedal stroke L is used as a basic parameter, it can be easily determined whether or not the press of the brake pedal 30 is released by monitoring the parameter.

On the other hand, the parameters ④ to ⑥ vary when a brake force of each wheel is changed. If the depression of the brake pedal 30 is released, there is no large changes generated in these parameters. Accordingly, when the parameters ④ to ⑥ are used as the basic parameter, it is effective to perform a determination for a termination of the brake assist control based on the output state of a pressing force switch that is provided for detecting whether or not the brake pressing force $F_P$ is applied.

As mentioned above, when the brake assist control is terminated, the STR 26, the SA-1 46, the SA-2 48 and the SA-3 54 changed from the ON state to the OFF state. In association with such a change, as mentioned above the first and second fluid pressure chambers 32a and 32b of the master cylinder are changed from a state in which they are caused to be a closed space to a state in which they communicate with the wheel cylinder 44FL\*\*. When the brake assist control is being performed, a high pressure of the accumulator 20 is provided to the wheel cylinder 44FL\*\*. On the other hand, the brake assist control is terminated at a time when a depression of the brake pedal is decreased to less than a predetermined degree. Accordingly, a pressure in each chamber of the master cylinder 32 immediately before the brake assist control is terminated is decreased to a value which is sufficiently lower than the wheel cylinder pressure. Accordingly, when the first and second fluid pressure chambers 32a and 32b are changed to the state in which they communicate with the wheel cylinder 44FL\*\* as mentioned above, a brake fluid in the wheel cylinder 44FL\*\* rapidly flows into the master cylinder 32. Such a rapid movement of the brake fluid generates a waving motion in the brake fluid, which results in a vibration generated in the master cylinder pressure $P_{M/C}$.

Figure 3:
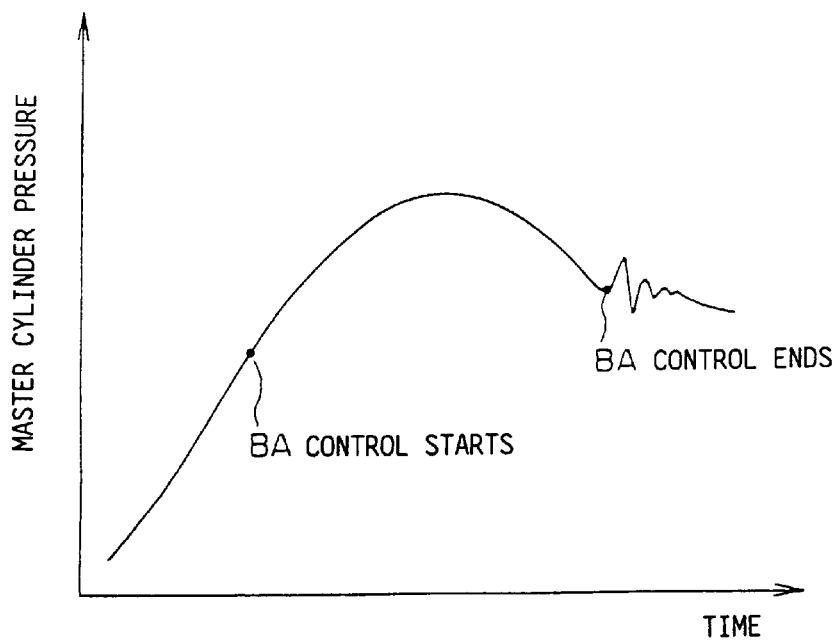
FIG. 3 is a graph showing a change in a master cylinder pressure with respect to time when a brake assist control is terminated.

FIG. 3 shows a change in the master cylinder pressure $P_{M/C}$ with respect to time when an execution of the brake assist control is terminated. As shown in FIG. 3, a vibration is generated at a time when the brake (assist control is terminated. Due to the vibration, $P_{M/C}$ and $\Delta P_{M/C}$ are temporarily increased, and it is possible to be determined that an emergency braking is required. As mentioned above, if a determination is made based only the fact as to whether or not the master cylinder pressure $P_{M/C}$ and the rate of change $\Delta P_{M/C}$ thereof exceeds the predetermined value, it is possible that the brake assist control is restarted immediately after the brake assist control is terminated even though an emergency braking is not required any more. In such a case, since the above-mentioned vibration rapidly attenuates, an end condition is immediately established and the brake assist control is terminated. Thereafter, on and off of the brake assist control is vibratory repeated, resulting in an incongruous feel to passengers of the vehicle.

The brake force control apparatus according to the present embodiment has a feature that an improper execution of the brake assist control caused by the vibration in the master cylinder pressure $P_{M/C}$ associated with the change in the control state by prohibiting a start of the brake assist control after the brake assist control was terminated and until the predetermined time has been passed.

Figure 4:
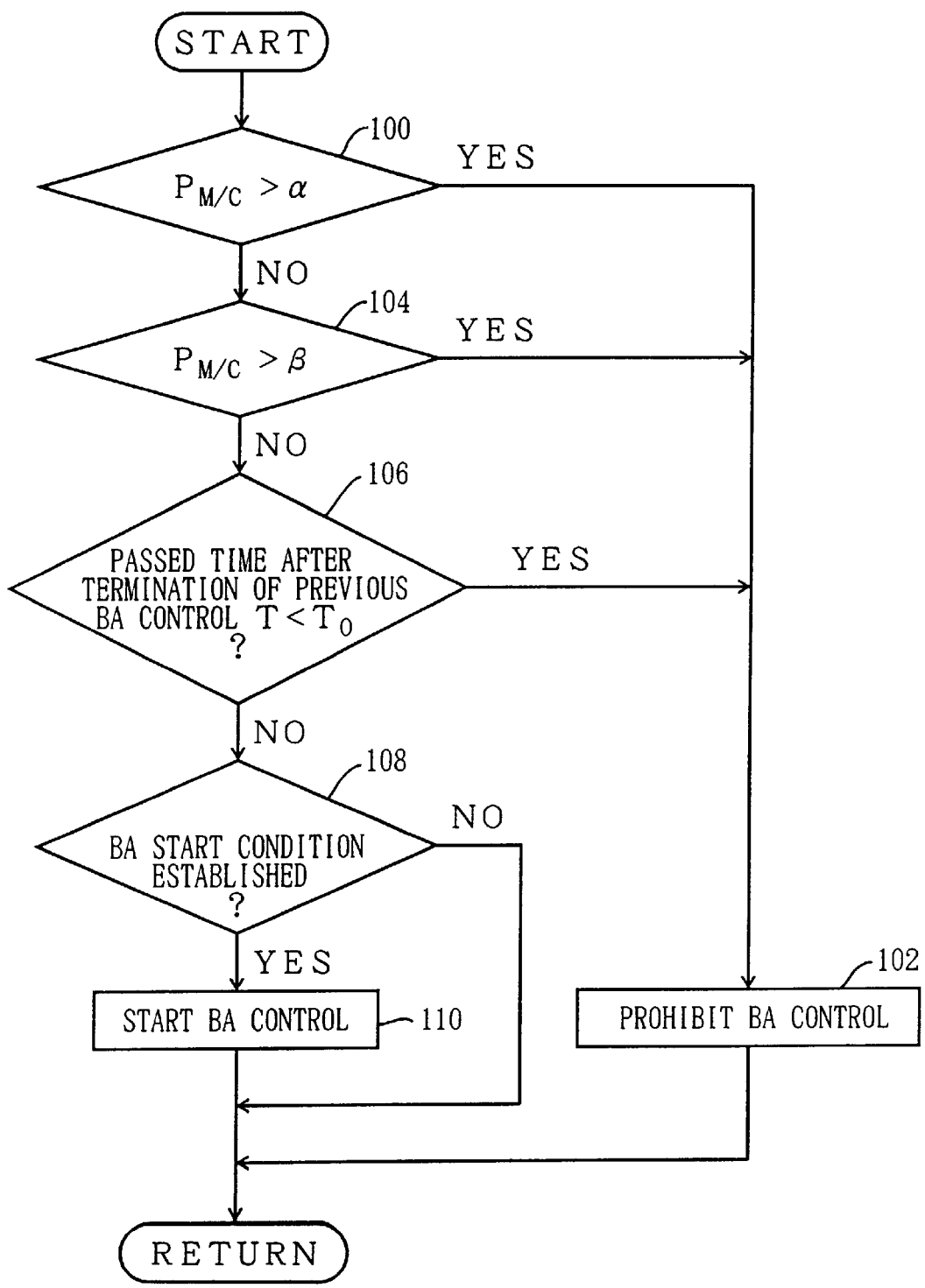
FIG. 4 is a flowchart of an example of a control routine performed in the brake force control apparatus shown in FIG. 1.

A description will now be given, with reference to FIG. 4, of contents of a process performed by the ECU 10 so as to achieve the above-mentioned function. FIG. 4 is a flowchart of an example of a control routine performed by the ECU 10. It should be noted that the routine shown in FIG. 4 is a periodic interruption routine which is started at every predetermined time. When the routine shown in FIG. 4 is started, the process of step 100 is performed first.

In step 100, it is determined whether or not the master cylinder pressure $P_{M/C}$ is larger than a predetermined value $\alpha$. The predetermined value $\alpha$ is a value which is not output when the hydraulic pressure sensor 40 is normally operated. Accordingly, if it is determined that $P_{M/C} > \alpha$ is established, it can be determined that an abnormality occurs in the hydraulic pressure sensor 40. In this case, the process of step 102 is performed subsequently. On the other hand, if it is determined that $P_{M/C} > \alpha$ a is not established, the process of step 104 is performed.

In step 102, execution of the brake assist control is prohibited. Accordingly, when an abnormality occurs in the hydraulic pressure sensor 40, the control is not continued based on an abnormal master cylinder pressure $P_{M/C}$. After the process of step 102 is completed, the routine at this time is ended.

In step 104, it is determined whether or not the rate of change $\Delta P_{M/C}$ of the master cylinder pressure $P_{M/C}$ is greater than a predetermined value $\beta$. The predetermined value $\beta$ is a value which is not generated when the hydraulic pressure sensor 40 normally outputs the master cylinder pressure $P_{M/C}$. Accordingly, if it is determined that $\Delta P_{M/C} > \beta$ is established, it can be determined that a noise is superimposed on the output signal of the hydraulic pressure sensor 40. In this case, the process of step 102 is performed subsequently. Thus, according to the brake force control apparatus of the present embodiment, an improper control is not performed due to an influence of a noise. On the other hand, if it is determined that $\Delta P_{M/C} > \beta$ is not established, the process of step 106 is performed next.

In step 106, it is determined whether or not a passe time T after the previous brake assist control was terminated is smaller than a predetermined time $T_0$. As a result, if it is determined that $T < T_0$ is still established, the process of step 102 is performed subsequently. On the other hand, if it is determined that $T < T_0$ is not established, the process of step 108 is performed subsequently.

It should be noted that the predetermined time T0 is set to be greater than a time $T_1$ which is necessary for the vibration to be sufficiently converged when the brake assist control is terminated and smaller than a shortest time $T_2$ which a time after the brake assist control was terminated and until the brake pedal is pressed to a degree such that an emergency braking is required. In the brake force control apparatus, the vibration generated when the brake assist control is terminated attenuates within about 100 ms. Additionally, when the driver repeats a depression and release of the brake pedal, a period of such a repetition is about 200 ms at the shortest even if the driver acts very quickly. That is, the shortest time $T_2$ after the brake assist control was terminated and until the brake pedal is pressed to a degree such that an emergency braking is required is less than 200 ms. Accordingly, the predetermined time to may be set within a range from 100 to 200 ms. In the present embodiment, T0 is se to 120 ms, for example.

In step 108, it is determined whether or not the start condition of the brake assist control is established. A determination as to whether or not the start condition of the bake assist control is established can be determined whether or not each of the master cylinder pressure $P_{M/C}$ and the rate of change $\Delta P_{M/C}$ thereof exceeds the predetermined value.

If it is determined, in step 108, that the start condition of the brake assist control is established, it is determined that an emergency braking operation is established and the process of step 110 is performed subsequently. On the other hand, if it is determined that the above mentioned start condition is not established, the routine at this time is ended without performing any process thereafter.

In step 110, an execution of the brake assist control is started. Thereafter, a degree of depression of the brake pedal is reduced, and the brake assist control is continued until the master cylinder pressure PM/C is decreased by more than a predetermined amount. After the process of step 110 is completed, the process at this time is ended.

According to the above-mentioned control routine, if the elapsed time after the brake assist control is terminated is less than the predetermined time T0, an execution of the brake assist control is prohibited. Thereby, if the start condition of the brake assist control is established due to the vibration of the master cylinder pressure PM/C immediately after the brake assist control is terminated, the brake assist control is prevented from being restarted improperly. In this case, as mentioned above, it is enabled to prevent the improper restart of the brake assist control by setting the predetermined time to t0 a value within a range from $T_1$ to $T_2$ while the brake assist control is always performed when an emergency control is required.

It should be noted that, as mentioned above, ① the brake pressing force $F_P$, ② the pedal stroke L, ④ the vehicle deceleration G, ⑤ the assumed vehicle speed $V_{SO}$ and ⑥ the wheel speed $V_W$ in addition to the above-mentioned ③ master cylinder pressure $P_{M/C}$ may be applicable as basic parameters. The vibration generated in the master cylinder pressure PM/C is transmitted to the brake pedal. Accordingly, a vibration is generated in ② the pedal stroke L. Additionally, at the time when the brake assist control is terminated, the pressing force applied to the brake pedal is reduced but continuously applied. Thereby, when the vibration is transmitted to the brake pedal, a vibration is generated in ① the brake pressing force $F_P$ irrespective of an intention of the driver. Further, when the brake assist control is terminated, a vibratory component appears in the behavior of the vehicle since a brake force is rapidly reduced. Thus, a vibration is generated also in ④ the vehicle deceleration G, ⑤ the assumed vehicle speed $V_{SO}$ and ⑥ the wheel speed $V_W$. As mentioned above, since a vibration is generated in the basic parameters when the brake assist control is terminated even if any one of parameters ① to ⑥ is used as the basic parameter, the start condition for the brake assist control may be established. Accordingly, the above-mentioned control routine can be effectively applied when the parameters other than ③ the master cylinder pressure $P_{M/C}$ is used as the basic parameter.

Figure 5:
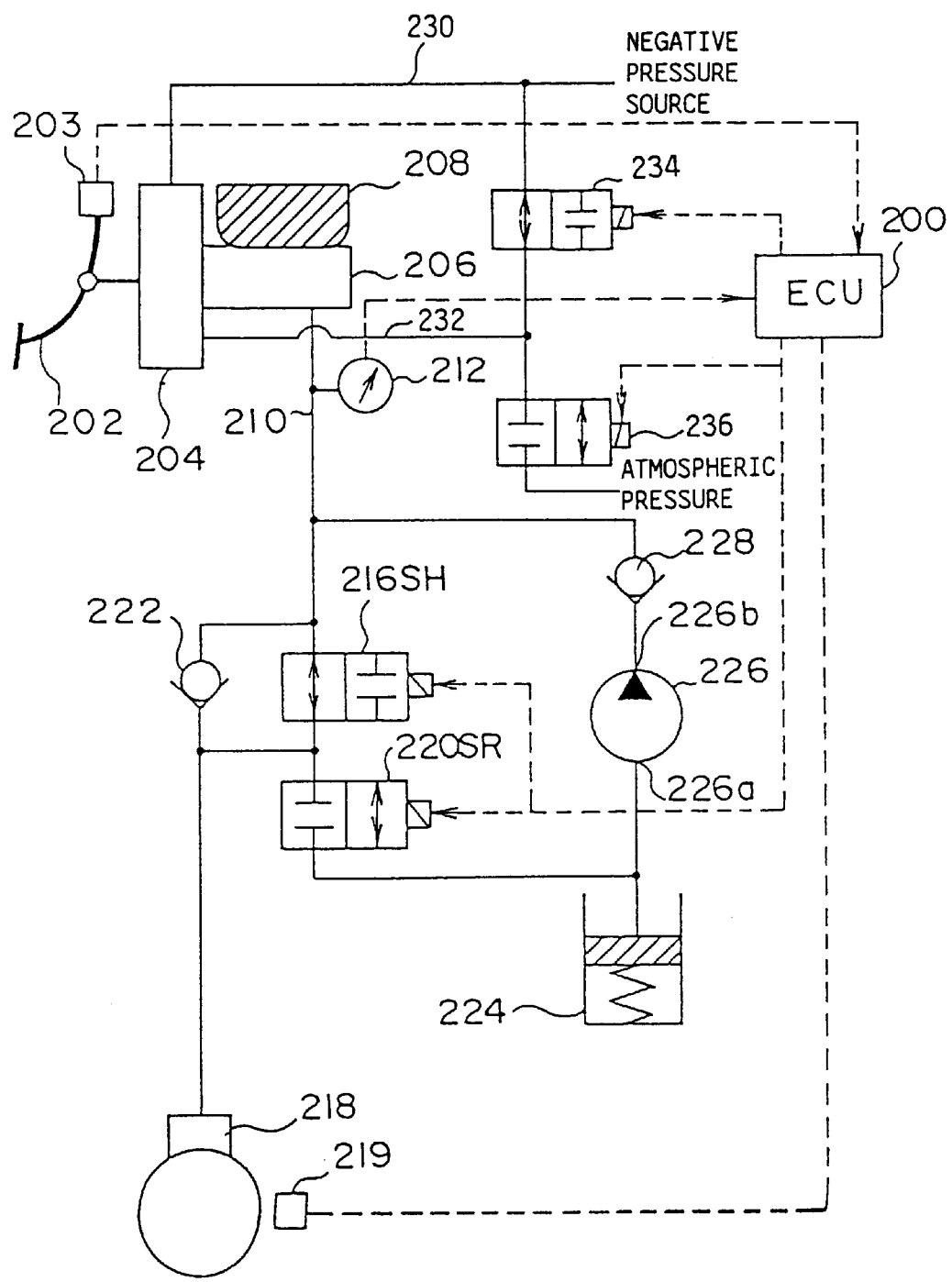
FIG. 5 is a system structure diagram of a brake force control apparatus according to a second embodiment of the present invention.

A description will now be given, with reference to FIG. 5 and FIG. 6, of a second embodiment according to the present invention. FIG. 5 shows a system structure diagram of a brake force control apparatus according to the present invention. It should be noted that, in FIG. 5, only a part of the brake force control apparatus corresponding to one wheel is shown for the sake of convenience.

The brake force control apparatus shown in FIG. 5 is controlled by an ECU 200. The brake forces control apparatus according to the present embodiment has a brake pedal 202. A brake switch 203 is provided near the brake pedal 202. The brake switch 203 is a switch which generates an ON output when the brake pedal 202 is pressed. The output signal of the brake switch 203 is supplied to the ECU 200. The ECU 200 determines whether or not a braking operation is being performed based on the output signal of the brake switch 203.

The brake pedal 202 is connected to a vacuum booster 204. The vacuum booster 204 is an apparatus which assists a brake pressing force by using an intake negative pressure of an internal combustion engine as a power source. The brake force control apparatus according to the present embodiment has a feature to generate an assist power having a predetermined power ratio with respect to a brake pressing force FP when a normal braking operation is performed, and generate a maximum assist power irrespective of the brake pressing force FP when an emergency braking is performed. A structure of the vacuum booster 204 will be described later.

A master cylinder 206 is fixed to the vacuum booster 204. The master cylinder 206 has a fluid pressure chamber therein. Additionally, a reservoir tank 208 is provided above the master cylinder 206. The fluid pressure chamber of the master cylinder and the reservoir tank 208 communicate with each other when a press of the brake pedal 202 is released, whereas they are disconnected from each other when the brake pedal is pressed. Accordingly, brake fluid is supplied to the fluid pressure chamber each time the press of the brake pedal 202 is released.

The fluid pressure chamber of the maser cylinder 206 communicates with a fluid pressure passage 210. The fluid pressure passage 210 is provided with a hydraulic pressure sensor 212 which outputs an electric signal corresponding to a pressure inside the fluid pressure passage 210. The output signal of the hydraulic pressure sensor 212 is supplied to the ECU 200. The ECU 200 detects a fluid pressure generated by the master cylinder 206, that is, the master cylinder pressure P$_{M/C}$ based on the output signal of the hydraulic pressure sensor 212.

The fluid pressure passage 210 is provided with a holding solenoid 216 (hereinafter, referred to as SH 216). The SH 216 is a two-position solenoid valve which maintains an open state in a normal state (OFF state). The SH 216 is set to be in an ON state (closed state) by a drive signal being supplied by the ECU 200.

The downstream side of the SH 216 communicates with a wheel cylinder 218 and a pressure decreasing solenoid 220 (hereinafter, referred to as SR220). The SR 220 is a two-position solenoid valve which maintains a closed state in a normal state (OFF state). SR 220 is set to be in an ON state (open state) by a drive signal being supplied by the ECU 200. Additionally, a checks valve 222 which permits a fluid flow only in a direction from the wheel cylinder 218 to the fluid pressure passage 210 is provided between the wheel cylinder 218 and the fluid pressure passage 210.

It should be noted that a wheel speed sensor 219 which generates a pulse signal each time the wheel rotates a predetermined angle is provided near the wheel cylinder 218. An output signal of the wheel speed sensor 219 is supplied to the ECU 200. The ECU 200 detects a wheel speed based on the output signal of the wheel speed sensor 219.

A reservoir 224 is provided on the downstream side of the SR 220. The brake fluid flowing out of the SR 220 when the SR 220 is set to be in the ON state (open state) is stored in the reservoir 224. It should be noted that the reservoir previously stores a predetermined amount of brake fluid. The reservoir 224 communicates with an inlet port 226a of a pump 226. Additionally, an outlet port 226b of the pump 226 communicates with the fluid pressure passage 210 via a check valve 228. The check vale 228 is a one-way valve which permits a fluid flow only in a direction from the pump 226 to the fluid pressure passage 210.

A description will now be given of a structure of the vacuum booster 204 and a structure of a periphery thereof. FIG. 6 shows a structure of the vacuum booster 204 and a structure of a periphery thereof. It should be noted that, in FIG. 6, the master cylinder 206 (not shown in FIG. 6 is fixed to the vacuum booster 204 on the left side thereof. Additionally, the brake pedal 202 (not shown in FIG. 6) is connected to the vacuum booster 204 on the right side thereof.

The vacuum booster 204 includes a housing 234 which comprises a front shell (F/S) 230 and a rear shell (RIS) 232. A diaphragm 236 and a cylinder member 238 are provided inside the housing 232. The cylinder member 238 is a cylindrical, elastic member having a side surface formed in bellows so that the cylinder member can be elongated and compressed in leftward and rightward directions in FIG. 6. An inner space of the housing 234 is divided into a negative pressure camber 240, a first pressure changing chamber 242 and a second pressure changing chamber 244 by the diaphragm 236 and the cylinder member 238.

The front shell 230 is provided with a negative pressure introducing port 246 which communicates with the negative pressure chamber 240. The negative pressure introducing port 246 communicates with a negative pressure passage 248 which communicates with a negative pressure source such as, for example, an intake passage of an internal combustion engine. The front shell 230 is also provided with a adjusting pressure introducing port 250 which communicates with the second pressure changing chamber 244. The adjusting pressure introducing port 250 communicates with a negative pressure introducing valve 252 and an adjusting pressure passage 256 which also communicates with an atmospheric pressure introducing valve 254.

The negative pressure introducing valve 252 is a two-position solenoid valve which is positioned between the adjusting pressure passage 256 and the negative pressure passage 248, and maintains an open state in a normal state (OFF state). On the other hand, the atmospheric pressure introducing valve 254 is a two-position solenoid valve which controls communication between the adjusting pressure passage 256 and an atmosphere, and maintains a closed state in a normal state (OFF state). The negative pressure introducing valve 252 and the atmospheric pressure introducing valve 254 are rendered to be in the ON state (closed state or open state, respectively), by a drive signal being supplied by the ECU 200.

The rear shell 232 is provided with cm atmospheric pressure introducing port 258 which communicates with the first pressure changing chamber 242. The atmospheric pressure introducing port 258 communicates with the adjusting pressure passage 256 via a check valve 260. The check valve 260 is a one-way valve which permits a fluid flow only in a direction from the adjusting pressure passage 256 to the atmospheric pressure introducing port 258. Accordingly, air flows through the atmospheric pressure introducing port 258 only when a pressure higher than a pressure in the first pressure changing chamber 242 is generated in the adjusting pressure passage 256.

A booster piston 262 is fit in the center of the diaphragm 236. The booster piston 262 is slidably supported by the rear shell 232 so that an end thereof is exposed in the second pressure-changing chamber 244. Additionally, the booster piston 262 is urged toward an original position, that is, in a rightward direction in FIG. 7, by a spring 263 provided within the second pressure-changing chamber 244.

An inner space 264 is formed in a center of the booster piston 262, the inner space extending in a radial direction of the booster piston 262. Additionally, the booster piston 262 is provided with a negative pressure passage which connects the second pressure changing chamber 244 to the internal space 264 and a pressure changing passage 268 which connects the internal space 264 and the first pressure changing chamber 242.

The internal space 264 of the booster piston 262 is provided with a pressing force transmitting member 270 which is slidable in an axial direction thereof. The pressing force transmitting member 210 has an annular air valve 272 on an end located on a rearward side of the vehicle, and has a cylindrical pressing force transmitting part 274 on an end located on a forward side of the vehicle.

A control valve 276 is provided in the internal space 264 of the booster piston 262. The control valve 276 includes a cylindrical part 278 fixed on an inner wall of the internal space 264 and a flat part 280 formed on an end located on a forward side of the vehicle. The flat portion 280 can move inside the inner space 264 in an axial direction of the control valve 276 with elongation and compression of the cylinder part 278.

A through hole 282 is formed in the flat portion 280 of the control valve 276, the through hole 282 extending in the center of the flat portion 280. An input rod 284 is inserted into the through hole 282. The diameter of the through hole 282 is sufficiently larger than the diameter of the input rod 284. Thus, an appropriate clearance is formed between the periphery of the input rod 284 and the through hole 282.

An end of the input rod 284 located on the forward side of the vehicle is connected to the pressing force transmitting member 270, and the other end of the input rod 284 located on the rearward side of the vehicle is connected to the brake pedal shown in FIG. 6. An end of a spring 286 is engaged with the input rod 284. The other end of the spring 286 is engaged with the cylindrical part 278 of the control valve 276. The spring 286 urges the input rod 284 and the pressing force transmitting member 270 toward the brake pedal 202 relative to the cylindrical part 278, that is, the booster 262. When a brake pressing force is not input to the input rod 284, the input rod 284 and the pressing force transmitting member 270 are held at a reference point shown in FIG. 1 by the above-mentioned urging force generated by the spring 286.

An end of a spring 288 is also engaged with the input rod 284. The other end of the spring 288 contacts the flat part 280 of the control valve 276. An urging force of the spring 288 serves as a force to urge the flat part 280 toward the air valve 272.

When the pressing force transmitting member 270 is held at the reference position as shown in FIG. 6, no force against the urging force of the spring 288 is exerted on the flat portion except for a reaction force generated by the air valve 272. Accordingly, when the pressing force transmitting member 270 is located at the reference point, the flat part 280 is maintained to be in contact with the air valve 272. The diameter of the air valve 272 is set to be larger than the diameter of the through hole 282 of the control valve 276. Accordingly, under such a condition, a state in which the through hole 282 is closed by the air valve 272 is established.

The booster piston 262 is provided with an annular valve seat 290 at a position opposite to the flat part 280 of the control valve 276. The valve seat 290 is formed so that a predetermined clearance is maintained between the valve seat 290 and the flat part 280 when the input rod 284 and the pressing force transmitting member 270 are located at the reference position. If there is a clearance between the valve seat 290 and the flat part 280, the above-mentioned negative pressure passage 266 communicates with the internal space 264. Additionally, if the valve seat 290 contacts the flat portion 280, the negative pressure passage 266 is disconnected from the internal space 264.

Air filters 292 and 294 are provided in the internal space 264 of the booster piston 262. The internal space 264 is open to an atmospheric space via the filters 292 and 294. Accordingly, an atmospheric pressure is always introduced around the through hole 282 of the control valve 276.

The booster piston 262 contacts a reaction disc 296 at an end surface located on the forward side of the vehicle. The reaction disc 296 is a disc-like; member formed by an elastic material. The other surface of the reaction disc 296 contacts an output rod 298. The output rod 298 is a member which is connected to an input shaft of the master cylinder 206 shown in FIG. 5. When a brake pressing force is exerted on the brake pedal 202, a pressing force corresponding to the brake pressing force is transmitted to the master cylinder via the output rod 298. On the other hand, a reaction force corresponding to the master cylinder pressure $P_{M/C}$ is input to the reaction disc 296.

The center of the reaction disc 296 is opposite to the pressing force transmitting part 274 of the pressing force transmitting member 270. The pressing force transmitting member 270 is formed so that a predetermined clearance is formed between the pressing force transmitting part 274 and the reaction disc 296 when the pressing force transmission member 270 is Located at the reference position with respect to the booster piston 262.

A description will now be given of an operation of the vacuum booster 204 and an operation of the brake force control apparatus according to the present embodiment. In the present embodiment, similar to the ECU 10 of the above-mentioned first embodiment, the ECU 200 determines whether the brake assist control should be started in accordance with the master cylinder pressure $P_{M/C}$ and the rate of change $\Delta P_{M/C}$ of the master cylinder pressure $P_{M/C}$.

That is, the ECU 200 continues the normal control when the master cylinder pressure $P_{M/C}$ and the rate of change $\Delta P_{M/C}$ of the master cylinder pressure $P_{M/C}$ detected by the hydraulic pressure sensor 212 do not satisfy the predetermined start condition. On the other hand, the ECU 200 starts the brake assist control when $P_{M/C}$ and $\Delta P_{M/C}$ thereof satisfy the start condition.

In the system according to the present embodiment, when the ECU 200 performs the normal control both the negative pressure introducing valve 252 and the atmospheric pressure introducing valve 254 are maintained to be in the OFF state. In this case, a negative pressure is introduced into the negative pressure chamber 240 of the vacuum booster 204, and a negative pressure is also introduced into the second pressure-changing chamber 244. A description will now be given of an operation of the vacuum booster 204 under such a condition.

When the brake pressing force $F_P$ is riot applied to the brake pedal 202, the input rod 284 and the pressing force transmitting member 270 are held at the reference position (position shown in FIG. 6). In this cease, a state in which the air valve 272 is seated on the flat part 280 of the control valve 276, and the flat part 280 is separated from the valve seat 290, that is, a state in which the pressure changing passage 268 is disconnected from the atmospheric space and communicates with the negative pressure passage 266, is formed.

Under such a condition, the second pressure-changing chamber 244 communicates with the first pressure-changing chamber 242. Accordingly, a pressure inside the first pressure-changing chamber becomes a negative pressure similar to the pressure inside the second pressure changing chamber 244 and the pressure inside the negative pressure chamber 240. When the pressure inside the first pressure-changing chamber 242 is equal to the pressure inside the second pressure-changing chamber 244, no force caused by the negative pressures is exerted on the diaphragm 236. Therefore, when the brake pressing force FP is not input, a pressing force is not transmitted from the output rod 298 to the master cylinder 206.

When the brake pressing force FP is applied to the brake pedal 202, the input rod 284 is moved relative to the booster piston 262 in the forward direction of the vehicle, that is, in the rightward direction in FIG. 6. When a relative displacement of the input rod 284 reaches a predetermined length, an end surface of the pressing force transmitting part 274 contacts the reaction disc 296, and the flat part 280 of the control valve 276 sits on the valve seat 290 of the booster piston 262 so that the negative pressure passage 266 is disconnected from the pressure changing passage 268.

If the input rod 284 is further pressed in the direction toward the reaction disc 296, the input rod 284 and the pressing force transmitting member 270 continues to move while elastically deforming the center part of the reaction disc 296, that is, a part of the reaction disc 296 (hereinafter, simply referred to as a center part) which contacts the pressing force transmitting part 274. If the relative displacement of the pressing force transmitting member 270 is increased as mentioned above, a reaction force corresponding to an elastic deformation, that is, an elastic force corresponding to the brake pressing force FP is transmitted to the input rod 284.

Additionally, after a state in which the flat part 280 is seated on the valve seat 290 is established as mentioned above, the displacement of the flat part 280 relative to the booster piston 262 is restricted. Thus, if the input rod 284 is further pressed in the direction toward the reaction disc 296 after such a condition is established, the air valve 272 is separated from the flat part 280 of the control valve 276, and the pressure changing passage 268 communicates with the through hole 282.

If such a state is established, an atmospheric air is introduced into the first pressure-changing chamber 242 via the through hole 282 and the pressure changing passage 268. As a result, the pressure inside the first pressure-changing chamber 242 becomes higher than the pressure inside the second pressure-changing chamber 244 and the negative pressure chamber 240. As mentioned above, if a pressure difference ΔPB is generated between the first pressure changing chamber 242 and each of the second pressure changing chamber 244 and the negative pressure chamber 240, a pressing force FA (hereinafter, referred to as brake assist force FA) which urges the diaphragm 236 in a direction toward the front of the vehicle is exerted on the diaphragm 236.

It should be noted that the brake assist force FA can be approximately represented by the following equation by using an effective cross-sectional area SB of the negative pressure chamber 240 and an effective cross-sectional area SC of the second pressure changing chamber 244.

$$F_A = (S_B + S_C) \cdot \Delta P_B \quad (2)$$

The thus-generated brake assist force FA is transmitted from the diaphragm 236 to the booster piston 262, and further transmitted to a periphery of the reaction disc 296, that is, a part of the reaction disc (hereinafter, simply referred to as a peripheral part) which contacts the booster piston 262.

When the brake assist force FA is input from the booster piston to the peripheral part of the reaction disc 296, an elastic deformation is generated in the peripheral part of the reaction disc 296. This elastic deformation increases as a pressure difference ΔP between opposite sides of the diaphragm 236 increases, that is, as the introduction of air into the first pressure changing chamber 242 is continued.

In the process in which an amount of elastic deformation in the peripheral part of the reaction disc 296 is increased as mentioned above, the booster piston is moved relative to a reaction force transmitting part 28 in the direction toward the front of the vehicle. Then, if the amount of elastic deformation of the peripheral part of the reaction disc 296 reaches a value almost equal to the amount of elastic deformation of the center part of the reaction disc 296, the flat part 280 of the control valve 276 contacts the air valve 272, and the introduction of atmospheric air to the first pressure changing chamber is stopped.

As a result, the pressure difference ΔP generated between opposite sides of the diaphragm 236 is adjusted to a value corresponding to the brake force FP input to the input rod 284. Additionally, the brake assist force $F_A = (S_B + S_C) \cdot \Delta P_B$ becomes a value corresponding to the brake pressing force FP. At this time, a resultant force of the brake assist force FA and the brake pressing force FP is transmitted to the master cylinder 206.

When the resultant force of the brake assist force FA and the brake pressing force FP is transmitted to the master cylinder 206, the master cylinder 206 generates a master cylinder pressure PM/C having a predetermined power ratio with respect to the brake pressing force FP.

The ECU 200 turns off the SH 216 and SR 220 so as to set the hydraulic circuit connected to the master cylinder 206 to a normal state. When the hydraulic circuit is set to the normal state, the master cylinder pressure PM/C is introduced into the wheel cylinder 218 as it is. Accordingly, the brake force generated in the wheel cylinder 218 is adjusted to a level corresponding to the brake pressing force FP.

If a slip rate S of a wheel exceeds a predetermined value after the braking operation is started, the ECU 200 starts the ABS control similar to the ECU 10 of the above-mentioned first embodiment. The ABS control is performed when the brake pedal 202 is pressed, that is, when the master cylinder pressure PM/C is appropriately increased.

Under the condition in which the master cylinder pressure PM/C is appropriately increased, the SH 216 is set to the open state and the SR 220 is set to the closed state, and, thereby, the wheel cylinder pressure PW/C is increased with the master cylinder pressure PM/C as an upper limit value. Hereinafter, this state is referred to as a pressure-increasing mode ①. Additionally, the wheel cylinder pressure PW/C is maintained without being increased or decreased by the SH 216 being set to the closed state and the SR 220 being set to the closed state. Hereinafter, this state is referred to as a holding mode ②. Further, the wheel cylinder pressure PW/C is decreased by the SH 216 being set to the closed state and the SR 220 being set to the open state. Hereinafter, this state is referred to as a pressure decreasing mode ③. The ECU 200 achieves, if necessary, the above-mentioned pressure-increasing mode ①, holding mode ② and pressure-decreasing mode ③ so that a slip rate S of the wheel becomes an appropriate value.

When a depression of the brake pedal 202 is released by the driver during execution of the ABS control, the wheel cylinder pressure PW/C must be immediately decreased. In the system according to the present embodiment, the check valve 222 is provided in the hydraulic circuit corresponding to the wheel cylinder 218. The check valve 222 permits a fluid flow only in the direction from the wheel cylinder 218 to the master cylinder 206. Thus, according to the system of the present embodiment, the wheel cylinder pressure P<sub>W/C</sub> of the wheel cylinder 222 can be immediately decreased after the depression of the brake pedal 202 is released.

In the system according to the present embodiment, when the ABS control is performed, the wheel cylinder pressure P<sub>W/C</sub> is increased by the master cylinder 206 as a fluid pressure source. Additionally, the wheel cylinder pressure P<sub>W/C</sub> is decreased by having the brake fluid in the wheel cylinder flow to the reservoir 224. Accordingly, if the pressure-increasing mode and the pressure-decreasing mode are repeatedly performed, the brake fluid in the master cylinder 206 gradually flows to the reservoir 224.

However, in the system according to the present embodiment, the brake fluid in the reservoir 224 is delivered to the master cylinder 206 by the pump 226. Thus, if the ABS control is continued for a long time, a so-called bottoming of the master cylinder does not occur.

A description will now be given of an operation achieved by the ECU 200 performing the brake assist control. As mentioned above, when the master cylinder pressure $P_{M/C}$ and the rate of change $\Delta P_{M/C}$ thereof satisfy the predetermined start condition, the ECU 200 starts the brake assist control. The brake assist control is achieved by turning on both the negative pressure introducing valve 252 and the atmospheric pressure introducing valve 254, that is, by closing the negative pressure introducing valve 252 and opening the atmospheric pressure introducing valve 254.

The ECU 200 maintains both the negative pressure introducing valve 252 and the atmospheric pressure introducing valve 254 to be set to the OFF state until the ECU 200 determines that the start condition of the brake assist control is established after the brake pedal 202 is pressed. Then, if it is determined that the start condition is established, both the negative pressure introducing valve 252 and the atmospheric pressure introducing valve 254 are set to the ON state.

Until both the negative pressure-introducing valve 252 and the atmospheric pressure introducing valve 254 are set to the ON state, the input rod 284 moves prior to the booster piston 262. As a result, the control valve 276 sits on the valve seat 290 and the air valve 272 separates from the control valve 276. Thereby, atmospheric air is introduced into the first pressure changing chamber 242, and the brake assist force $F_A=(S_B+S_C)\cdot\Delta P_B$ is generated.

Under such a condition, if the negative pressure introducing valve 252 and the atmospheric pressure introducing valve 254 are set to the ON state, a pressure inside the first pressure changing chamber 242 and the second pressure changing chamber 244 is rapidly increased to an atmospheric pressure. As a result, a pressure difference $\Delta P_{AIR}$ is generated between the negative pressure chamber 240 and the first pressure changing chamber 242. In this case, a brake assist force $F_A$ represented by the following equation is exerted on the diaphragm 236.

$$F_A = S_B \cdot \Delta P_{AIR} \qquad (3)$$

The brake assist force $F_A$ is transmitted from the diaphragm 236 to the booster piston 262, and further transmitted to the peripheral part of the reaction disc 296. Additionally, the brake pressing force $F_P$ which is exerted on the brake pedal 202 is also transmitted to the reaction disc 296. Accordingly, thereafter, a resultant force of the brake assist force $F_A$ and the brake pressing force $F_P$ is transmitted to the master cylinder 206.

In the system according to the present embodiment, similar to the above-mentioned first embodiment, the brake assist control is started when the brake pressing force $F_P$ is not sufficiently increased, that is, under a condition in which a large brake assist force $F_A$ has not been obtained. Accordingly, the brake assist force $F_A$ exerted on the booster piston 262 shows a sharp increase before or after the brake assist control is started.

If the sharp change occurs in the brake assist force $F_A$ as mentioned above, the booster piston 262 is rapidly and relatively moved toward the front of the vehicle immediately after the brake assist control is started. Then, when such a sharp change is generated in the booster piston 262, a phenomenon occurs in which the control valve 276 which was seated on the valve seat 290 before the brake assist control was started is separated from the valve seat 290 when the control is started.

When the control valve 276 is separated from the valve seat 290, the second pressure changing chamber 244 communicates with the first pressure changing chamber 242. Accordingly, if a negative pressure is stored in the second pressure changing chamber 244, the negative pressure is provided from the second pressure changing chamber 244 to the first pressure changing chamber 242 after the brake assist control is started. As a result, there is a problem in that the brake assist force $F_A$ cannot be raised immediately.

However, in the vacuum booster 204 of the present embodiment, atmospheric air is introduced into the second pressure-changing chamber 244 at the same time the brake assist control is started. Thus, according to the system of the present embodiment, if the phenomenon in which the control valve 276 is separated from the valve seat 290 after the brake assist control is started occurs, the brake assist force $F_A$ can be raised immediately.

The ECU 200 sets the hydraulic circuit connected to the master cylinder 216 to a normal state after the execution condition of the brake assist control is established and until the execution condition of the ABS control is established. In this case, the master cylinder pressure $P_{M/C}$ is introduced to the wheel cylinder 218 without change. Accordingly, the wheel cylinder pressure $P_{W/C}$ is rapidly increased from a pressure corresponding to "$(S_B+S_C)\cdot\Delta P_B+F_P$" to a pressure corresponding to "$S_B\cdot\Delta P_{AIR}+F_P$" when the brake assist control is started.

As mentioned above, according to the system of the present embodiment, when an emergency braking operation is performed, the wheel cylinder pressure $P_{W/C}$ can be rapidly increased to a value sufficiently larger than the brake pressing force $F_P$. Thus, according to the system of the present embodiment, a large brake force can be generated immediately after establishment of a condition in which an emergency braking is required is established even if the driver is a beginner-grade driver.

After the wheel cylinder pressure $P_{W/C}$ is rapidly increased as mentioned above, the slip rate S of the wheel is rapidly increased, and finally the execution condition of the ABS control is established. After the execution condition of the ABS control is established, the ECU 200 sets, if necessary, the above-mentioned pressure increasing mode ①, holding mode ② and pressure decreasing mode ③ so that a slip rate S of the wheel becomes an appropriate value.

In the system according to the present embodiment, in a period during which the brake pressing force $F_P$ is applied to the brake pedal 202 after the brake assist control is started, the master cylinder pressure $P_{M/C}$ is maintained to be a pressure corresponding to "$S_B\cdot\Delta P_{AIR}+F_P$". Accordingly, by monitoring the output signal of the master cylinder pressure P$_{M/C}$ detected by the hydraulic pressure sensor 212, the ECU 200 can determine whether or not the depression of the brake pedal 202 is released by more than a predetermined amount. Upon detection of the release of the depression of the brake pedal 202 by more than the predetermined amount, the ECU 200 stops supply of the drive signals to the negative pressure introducing valve 252 and the atmospheric pressure introducing valve 254, and terminates the brake assist control.

In the above-mentioned second embodiment, as mentioned above, the master cylinder pressure P$_{M/C}$ is discontinuously decreased from a pressure corresponding to "S$_B$·ΔP$_{AIR}$+F$_P$" to a pressure corresponding to "(S$_B$+S$_C$)·ΔP$_B$+F$_P$" when the brake assist control is terminated. Thereby, the change in the master cylinder pressure P$_{M/C}$ accompanies a vibration. Accordingly, similar to the above-mentioned first embodiment, it is possible that the master cylinder pressure P$_{M/C}$ and the rate of change ΔP$_{M/C}$ of the master cylinder pressure P$_{M/C}$ satisfy the start condition of the brake assist control immediately after the brake assist control is terminated. In the present embodiment, the brake assist control is prevented from being improperly started, immediately after the brake assist control is terminated, by the ECU 200 performing the control routine shown in FIG. 4 similar to the case of the above-mentioned first embodiment.

It should be noted that, in the above-mentioned second embodiment, although the master cylinder pressure P$_{M/C}$ is used as the basic parameter for discriminating a normal braking operation and an emergency braking operation, the basic parameter is not limited to this, and, similar to the first embodiment, the brake pressing force F$_P$, the pedal stroke L, the vehicle deceleration G, the assumed vehicle speed V$_{SO}$ or the vehicle speed V$_W$** may be used as the basic parameter.

The present invention is not limited to the specifically disclosed embodiments, and variations and modifications may be made without departing from the scope of the present invention.

What is claimed is:

1. A brake force control apparatus of a vehicle selectively performing a normal control for generating a brake force corresponding to a brake pressing force and a brake assist control for generating a brake force larger than that of the normal control, characterized by:

control start determining means for determining (step 108) whether or not the brake assist control should be performed based on a change in a driving condition of said vehicle due to an operation of a brake pedal (30; 202); and control prohibiting means for prohibiting (step 106, 102) an execution of a subsequent brake assist control operation after a previous brake assist control operation was terminated and until a predetermined time has been passed.

2. The brake control apparatus as claimed in claim 1, characterized in that said control start determining means determines whether or not the brake assist control should be performed based on a pressure (P$_{M/C}$) of a master cylinder (32; 206).

3. The brake control apparatus as claimed in claim 2, characterized in that said control start determining means prohibits (step 100, 102) the brake assist control when the pressure (P$_{M/C}$) of the master cylinder (32; 206) is greater than a predetermined value.

4. The brake control apparatus as claimed in claim 2, characterized in that said control start determining means prohibits (step 104, 102) the brake assist control when a rate of change (ΔP$_{M/C}$) of the pressure (P$_{M/C}$) of the master cylinder (32; 206) is greater than a predetermined value.

5. The brake control apparatus as claimed in claim 1, characterized in that said predetermined time ranges from 100 milliseconds to 200 milliseconds.

6. The brake control apparatus as claimed in claim 1, characterized in that said predetermined time is 120 milliseconds.

7. The brake control apparatus as claimed in claim 1, characterized in that said control start determining means determines whether or not the brake assist control should be performed based on a brake pressing force (F$_P$).

8. The brake control apparatus as claimed in claim 1, characterized in that said control start determining means determines whether or not the brake assist control should be performed based on a pedal stroke (L) of the brake pedal (30; 202).

9. The brake control apparatus as claimed in claim 1, characterized in that said control start determining means determines whether or not the brake assist control should be performed based on a deceleration (G) of said vehicle.

10. The brake control apparatus as claimed in claim 1, characterized in that said control start determining means determines whether or not the brake assist control should be performed based on a speed (V$_{SO}$) of said vehicle.

11. The brake control apparatus as claimed in claim 1, characterized in that said control start determining means determines whether or not the brake assist control should be performed based on a wheel speed (V$_W$**) of said vehicle.

* * * * *

UNITED STATES PATENT AND TRADEMARK OFFICE
CERTIFICATE OF CORRECTION

PATENT NO. : 6,129,423
DATED : October 10, 2000
INVENTOR(S) : Yoshiyuki Hashimoto It is certified that error appears in the above-identified patent and that said Letters Patent is hereby corrected as shown below:

| Column | Line | |
|---|---|---|
| 1 | 57 | Change "exceeds" to --exceed--. |
| 2 | 65 | After "vehicle" insert --,--. |
| 3 | 48 | Change "set" to --sets--. |
| 6 | 42 | Change "4E3" to --48--. |
| 7 | 65 | Before "hydraulic" delete "a". |
| 8 | 30 | Change "ABC" to --ABS--. |
| 9 | 48 | After "operation" change "to" to --of--. |
| 10 | 3 | Change "en" to --an--. |
| 10 | 15 | Change "pint" to --point--. |
| 12 | 65 | After "state" insert --is prevented--. |

UNITED STATES PATENT AND TRADEMARK OFFICE
CERTIFICATE OF CORRECTION

PATENT NO. : 6,129,423
DATED : October 10, 2000
INVENTOR(S) : Yoshiyuki Hashimoto It is certified that error appears in the above-identified patent and that said Letters Patent is hereby corrected as shown below:

| Column | Line | |
|---|---|---|
| 13 | 39 | Change "passe time" to --passed time period--. |
| 13 | 63 | Change "se" to --set--. |
| 13 | 66 | Change "bake" to --brake--. |
| 14 | 53 | Change "the parameters" to --a parameter--. |
| 15 | 27 | Change "maser" to --master--. |
| 15 | 49 | Change "checks" to --check--. |
| 16 | 13 | Change "(RIS)" to --(R/S)--. |
| 16 | 49 | Change "cm" to --an--. |
| 18 | 13 | After "disc-like" delete ";". |
| 18 | 29 | Change "Located" to --located--. |

UNITED STATES PATENT AND TRADEMARK OFFICE
CERTIFICATE OF CORRECTION

PATENT NO. : 6,129,423
DATED : October 10, 2000
INVENTOR(S) : Yoshiyuki Hashimoto It is certified that error appears in the above-identified patent and that said Letters Patent is hereby corrected as shown below:

| Column | Line | |
|---|---|---|
| 18 | 56 | Change "riot" to --not--. |
| 18 | 59 | Change "cease" to --case--. |

Signed and Sealed this

Twenty-second Day of May, 2001

Attest:

NICHOLAS P. GODICI

*Attesting Officer*     *Acting Director of the United States Patent and Trademark Office*